United States Patent [19]

Ruhl

[11] 3,829,660

[45] Aug. 13, 1974

[54] PEN CHART ANALYSER

[76] Inventor: Hermann Ruhl, 40 Advance Rd., Toronto 18, Ontario, Canada

[22] Filed: Nov. 16, 1972

[21] Appl. No.: 307,138

[30] Foreign Application Priority Data

Nov. 19, 1971 Canada............................128,143

[52] U.S. Cl....235/61.6 A, 235/61.11 E, 340/146.3 AC, 346/74 R

[51] Int. Cl...... G06k 7/14, G06k 15/20, G06k 9/06

[58] Field of Search235/61.11 R, 61.11 A, 61.11 B, 235/61.11 C, 61.12 R, 61.6 A, 61.6 R, 61.11 E; 250/219; 179/15 BS; 340/172.5, 146.3 AC; 346/74 R

[56] References Cited

UNITED STATES PATENTS

| | | | |
|---|---|---|---|
| 3,014,651 | 12/1961 | Hibbard | 235/61.6 A |
| 3,184,581 | 5/1965 | Willoughby | 179/15 BS |
| 3,229,073 | 1/1966 | Macker | 235/61.11 E |
| 3,259,733 | 7/1966 | Klaver | 235/61.6 A |
| 3,341,691 | 9/1967 | Modersohn | 235/61.11 E |
| 3,418,456 | 12/1968 | Hamish | 235/61.11 E |
| 3,585,367 | 6/1971 | Humbarger | 235/61.11 E |
| 3,598,980 | 8/1971 | Lawrence | 235/61.6 A |
| 3,643,068 | 2/1972 | Mohan | 235/61.11 E |
| 3,671,716 | 6/1972 | Slutsky | 235/61.6 A |

*Primary Examiner*—Daryl W. Cook
*Assistant Examiner*—Robert M. Kilgore

[57] ABSTRACT

The specification sets forth an analyser for retrieving event time information from a multi-channel graphical record sheet, comprising drive means for conveying the sheet past a linear detector device comprising a series of light sensitive elements which generate signal currents proportional to light from the chart. The drive means further includes a pulse generator for producing time base pulses in proportion to the movement of the chart and representing a predetermined time increment unit. A processor receives signals from the light sensitive devices, correlates these to each other and with the time base pulses transmits these to an output device in accordance with the desired analysis information.

12 Claims, 4 Drawing Figures

PATENTED AUG 13 1974

3,829,660

PEN CHART ANALYSER

This invention relates to an analyser for retrieving information from an event time chart sheet.

A disc chart is a circular form of chart usually provided on a disc of paper upon which a pen recorder records information responsive to operating conditions of motor vehicles, production machinery or processes in particular. It is the custom in analysing disc charts obtained from truck transport operations to read such charts and to enter extracted information on printed forms to provide analysed and totalysed reports covering loading times, operating times, distances travelled, gas consumption and the like. Each different class of information is recorded by pen recorders in a truck by a different track or channel for each class of information spaced a different radial distance from the centre of the record disc. One rotation of the disc may represent 24 hours, 12 hours or any other such unit of time.

It is desirable to analyse chart records by units of time representing small units such as one part in one thousand of the total number of hours of chart capacity. Prior systems for disc chart readout are of substantial complexity in that the information tracks are read successively to provide a plurality of successive information signals each requiring different processing for ultimate readout. Accordingly the different kinds of information extracted can be combined according to requirements of different selected programmes for totalising and compared or otherwise processed only after all of the information from the disc record has been extracted and recorded. It is then reproduced from record storage or otherwise reprocessed by programme re-processing computer technique or the like.

It is a main object of the present invention to provide an analyser for an event time chart sheet in which all information is extracted simultaneously for each time base unit whereby said information may be processed for computation prior to storage or display.

It is another object of the invention to provide an analyser as set forth herein which is adapted to retrieve information in time base units of the order of 1/1,000 of an hour or less.

It is a still further object of the invention to provide an analyser in which the time base may be changed by a time base switch to adapt the same to any one of a number of different chart interval types.

It is a still further object of the invention to provide a disc chart analyser in which the information on different tracks may be selected for processing by a programmable connecting device adapting same for ready changing of a programme by the user prior to processing, storage, display or recording.

Other objects of the invention will be appreciated by a study of the following specification taken in conjunction with the accompanying drawings.

IN THE DRAWINGS

Figures 1, 2, 3, 4:
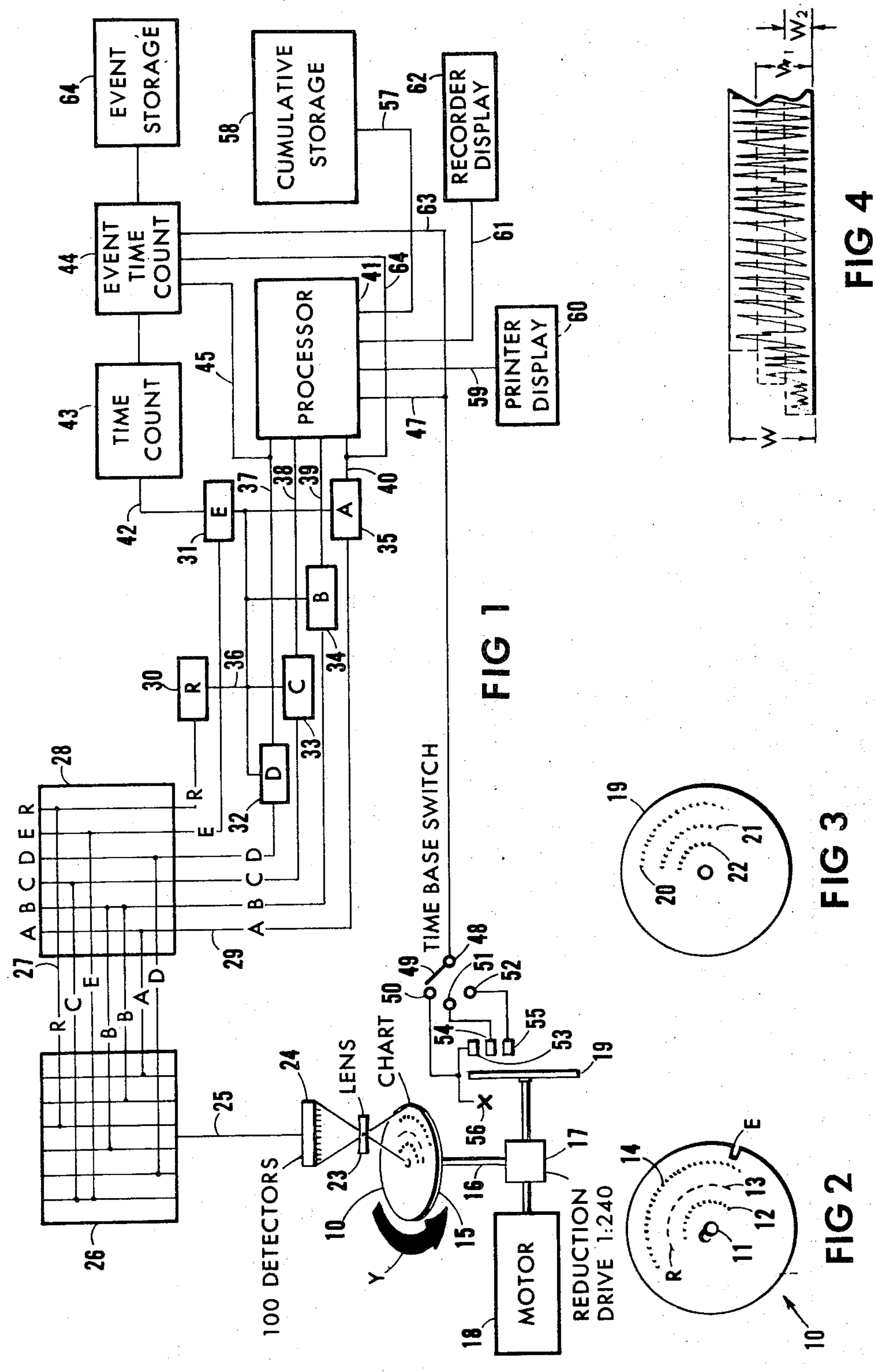
FIG. 1 is an electro-mechanical diagram of a disc chart type of analyser of the invention.
FIG. 2 is a view of a typical disc chart useful in the analyser of FIG. 1.
FIG. 3 is a view of an apertured time base disc used in the analyser of the invention of FIG. 1.
FIG. 4 is an enlarged view of a single track of information on the disc chart of FIG. 2 revealing a manner of recording thereon according to the invention to obtain a number of kinds of information from the same information track.

Referring to the drawings, the disc chart analyser of the invention is adapted automatically and simultaneously to extract and process information from a disc chart 10 as seen in FIG. 2 having a central mounting aperture 11 surrounded by a plurality of ring-like tracks 12, 13, 14 etc., of different classes of information placed thereon by pen recording heads. At least three such tracks are usually provided. The disc chart is usually divided into either twelve hours or 24 hours.

In the analyser of the invention shown in FIG. 1 the disc chart 10 is supported on a turntable 15 rotated by shaft 16 in a predetermined direction such as in the direction of the arrow Y by reduction drive devices 17 driven by motor 18 to drive apertured disc 19 on shaft 20 two hundred and forty revolutions for each revolution of turntable 15, that is the drive ratio of the reduction drive devices is 1:240. Apertured disc 19 as seen in FIG. 3 carries three rows or series of apertures, the outer row 20 preferably containing 120 apertures equally angularly spaced apart, the middle row 21 preferably containing 100 apertures and the inner row 22 preferably containing 50 apertures.

A lens 23 is located above turntable 15 between chart 10 and a detector head 24, the latter containing a strip of about 100 detector devices. Such detector devices can be obtained from a number of sources providing solid state dimensionally linearly aligned arrays of photo-sensitive detectors, such as small light sensitive diodes, preferably in the form of so-called silicon pin diodes of a very narrow centre to centre spacing. The array is supported radially over a chart in the manner indicated in FIG. 1 to detect information over a radial line of minimum width at any time instant on the chart disc 10. Multiple cable 25 connects detector head 24 to a grid programme pin connector board 26 having vertical and transverse co-ordinates representing each of the detectors and adapted to be connected by connecting plug-in wires 27 to different transverse and vertical co-ordinate connections of the programmable connector board 28 from which a plurality of ordinate connecting lines 29 proceed to signal amplifiers 30, 31, 32, 33, 34, 35.

In operation, the programmable connector boards 26, 28 are interconnected by lines 27 to extract particular information signals in a specific order or array from detector 24. Thus, for example, connections A, B, C, D for lines A, B, C, D of corresponding amplifiers 32 to 35 will separate different channels of information detected by detector 24 into the respective amplifiers. Notice, however, that two programme connectors are shown for B channel information. In other words, information may be combined from different channels or differently in the same channel by means of the programmable connecting devices in the form of connecting boards 26, 28. Thus, for example, as shown in FIG. 4 a full width W of maximum pen excursion of a recording pen describes different information than an excursion of a width W1 or of a lesser width W2. Multiple information may be extracted and separated from the one channel and in its separation may be programmed or connected to different signal amplifiers by this programming technique. The pen excursion of full width W in any one channel may traverse a number of individual detectors by virtue of the close centre to centre spacing of the diode elements of the detector so that an excursion of three one-hundredths of an inch maximum would, in the present example, activate three detectors.

In order to render the magnitude of the signals independent of the base illumination level of the chart the invention contemplates the detection of light value from a non-information channel R (FIG. 2). The R channel of information is amplified by amplifier 30 and the signal thereof employed by output line 36 connecting to all other amplofiers as an automatic amplitude reference control (AVC) of conventional nature embodied in said amplifiers whereby the output signals in lines 37, 38, 39, 40 of the differential amplifiers A, B, C, D proceed to processor 41 and dependent on the light level difference between the chart surface and the recordings and not on the absolute value of the light level of the recordings. In order to obtain a time start signal for chart readout, a mark E is preferably set on the chart 10 or on turntable 15 to provide a signal on a channel E passing through amplifier 31 likewise depending on the light level difference of the signal from line 26 to the base light level of the chart. Output line 42 actuates the time counter 43 controlling event time counter device or clock 44 receiving signals from two selected amplifiers, such as channel information D by line 45 and channel information A by line 46. Processor 41 combines the input signals from lines 27 to 40 with time base signal by way of line 47 from time base switch 48 having switch arm 49 connecting to the appropriate time base switch terminal 50, 51 or 52, the latter are connected to separate photocells or light sensitive diodes 53, 54, 55 adapted to be activated by light from source 56 passing through an aperture of apertured disc 19.

Output signal from processor 41 passes by way of line 57 to accumulator storage device 58 such as a computer memory bank to cause the information to be stored with reference to time base pulses and the duration and spacing thereof. Line 59 connecting processor 41 to the printer display device 60, having a printer or visual readout display, embodies the time base pulse information. Likewise line 61 feeding output of processor 41 to recorder display device 62 enables the recording or simultaneous display of the information as it is processed relative to time base units. The event time counter likewise by line 63 combines signal from time counter 43 and time base units from time base switch 48 which, when processed with information from channel D by line 45 and channel A by line 46, enables a time count of the event of the information which may be recorded in an event storage unit 64.

It will be evident from the foregoing that the invention enables a maximum of flexibility to the operator in the selection and combining of information in the first instance by the connector of the programmable channel detector device in the form of the connector boards 26, 28 and connector lines 27. The selectable base pulse generator comprising the time base pulse disc 19 and detectors 53, 54, 55 enables a flexibility of processing by a single processor 41 with a minimum of complexity adapting signal information thereafter to be fed directly into conventional computer display and recorder devices. The additional advantage of providing for signal amplitude recognition by utilising an empty channel R as reference as described avoids substantial complexity or prior devices which attempt to compensate for differences in the character of the reflected light from a chart such as may be due to a slight change in color or smudge arising from handling of a paper chart. Further, the provision of a starting signal enables an event time count by means of which a printout can be obtained for the time of day relative to the information provided.

While the analyser of the invention is especially useful for extracting information from disc type pen charts of the paper sheet type, it will be evident that the present disclosure, having set forth a particular way of extracting information from this particular kind of chart, is also readily adaptable for extraction of information from a continuous sheet or strip as found in the roll strip type of chart so long as the lineal detector head is mounted transversely and at right angles to the direction of motion of the chart information past the detector head and the carrier for the chart. In such arrangement the disc turntable may be in the form of a drum. The drive of the drum and the time base pulse generator are related directly by the drive device in the manner described.

The analyser herein retrieves event time information from an event time chart sheet having a plurality of pen recorded information channels thereon in side by side parallel spaced apart relationship and of common time instant in a right angular transverse line or direction therethrough. The analyser herein generally combines a carrier or transport device for the chart sheet, a time base pulse generator and drive mechanism driving the carrier and time base generator in fixed relative ratio as to their relative motion to generate a time base pulse for each predetermined unit of motion of the carrier and chart thereon corresponding to a unit of time of preferably less than one minute in duration and of the order of about three seconds only. A linear detector device is mounted in spaced relation to the carrier at right angles to the motion of the chart thereon and presents a series of individual light sensitive detector elements each providing a signal responsive to light from the corresponding finite or small area of the chart to which each element is exposed. Programmable detector devices enable the operator to establish a predetermined programme for communication of the information detected or extracted to an analyser output device through appropriate signal amplifiers. Such signals are first processed by a processor which permits transfer of the signals to the output device in accordance to a logic programme by which certain conditions of the signals must be met to allow some or all of them to be transferred. This processor also controls the passing of time base pulses to the output devices in accordance with preselected combinations of the signals.

I claim as my invention:

1. An analyser for retrieving event timed information from an event timed chart sheet having stylus recorded information channels thereon in side by side parallel spaced apart relationship and of common time instant in a right-angular transverse line therethrough and comprising in combination: a carrier for said chart sheet; a time base pulse generator; a drive mechanism driving said carrier in a fixed relative ratio to the time base pulses generated so that each unit of motion of said carrier and chart thereon corresponds to a predetermined incremental unit of time; an optical electronic scanning detector device having a linear direction of detection at right angles to the motion of the chart on said carrier, said detector scanning a plurality of channels in one pass of said chart and providing signals responsive to varying light levels reflected from said chart; an output system; and a processor including means for communicating said time base pulses from said time base pulse generator to said output system to measure the time frame of said events recorded on said plurality of stylus recorded information channels; said means for communicating said time base pulses to said output device being responsive to pre-determined signal conditions.

2. The apparatus of claim 1 wherein said optical electronic scanning detector comprises a series of individual light sensitive electronic detector elements, each providing signals responsive to light levels reflected from said chart.

3. The apparatus of claim 1 wherein said amplifier system comprises a plurality of amplifiers selectively connected to said plurality of detector elements.

4. An analyser of claim 1 wherein said processor includes means for communicating said signals of said predetermined condition from said signal amplifier system to said output system.

5. The combination of claim 1 and a lens between a chart on said carrier and said lineal detector device.

6. The combination of claim 2 and means for controlling the signal output of each of said amplifiers to substantially an amplitude corresponding to the light level difference comprising a light sensitive detector element in said detector device located to detect light value from said chart in a non-information area of said chart thereby to generate a light value signal; and an amplitude control for each of said signal amplifiers for controlling the amplification of information signal thereby universely responsive to said non-information signal.

7. The combination of claim 2 in which the event time chart sheet is characterised by starting time information thereon and one of said detector elements is located to generate a signal responsive to detection of said time start information; said amplifier system including an amplifier for said time start signal; and a time counter actuated to develop a time count signal when said predetermined signal conditions are provided by said detector device (responsive to said time start signal).

8. The combination of claim 1 in which the output device comprises a cumulative information storage unit.

9. The combination of claim 1 in which the output device comprises an information storage unit and readout devices.

10. The combination of claim 7 in which the (analyser) output device comprises an information storage unit storing event timed information from said time counter unit to record the number of events in any one of said stylus recorded information channels.

11. The combination of claim 1 in which the time base pulse generator comprises a rotatable disc driven by said drive mechanism having at least one series of apertures therein, said apertures being at the same radius and at equi-angular spacing; a light source and a light detector on opposite sides of said disc at said radius and adapted to generate electrical pulse signals responsive to activation of said detector by said light source through an aperture of said disc upon rotation of the latter.

12. The combination of claim 11 and at least one other series of apertures in said disc and a corresponding light source and detector therefor, each series of apertures consisting of a different number of apertures than another series; and a manual switch in said analyser for selecting a time base pulse from said generator, a thus selected disc aperture series and detector therefor.

* * * * *